United States Patent [19]

Takahashi

[11] Patent Number: 5,400,421
[45] Date of Patent: Mar. 21, 1995

[54] OPTICAL DEMULTIPLEXING/MULTIPLEXING DEVICE

[75] Inventor: Mitsuo Takahashi, Matsudo, Japan

[73] Assignee: Seikoh Giken Co., Ltd., Chiba, Japan

[21] Appl. No.: 89,441

[22] Filed: Jul. 12, 1993

[30] Foreign Application Priority Data

Dec. 8, 1992 [JP] Japan .................... 4-351832

[51] Int. Cl.$^6$ .............................. B02B 6/26
[52] U.S. Cl. ...................... 385/24; 385/30; 385/38; 385/42; 385/43; 385/45; 385/59
[58] Field of Search .............. 385/24, 27, 30, 38, 385/39, 42, 43, 45, 55, 59, 60

[56] References Cited

U.S. PATENT DOCUMENTS

| | | | |
|---|---|---|---|
| 4,666,541 | 5/1987 | Le Noane et al. | 156/158 |
| 4,707,062 | 11/1987 | Abe et al. | 385/24 |
| 4,720,161 | 1/1988 | Malavieille | 385/43 |
| 5,000,530 | 3/1991 | Takahashi | 359/115 |
| 5,074,634 | 12/1991 | Takahashi | 359/127 |
| 5,129,020 | 7/1992 | Shigematsu et al. | 385/43 |
| 5,179,604 | 1/1993 | Yanagawa et al. | 385/24 |
| 5,214,730 | 5/1993 | Nagasawa et al. | 385/59 |

*Primary Examiner*—Frank Gonzales
*Attorney, Agent, or Firm*—Spencer, Frank & Schneider

[57] ABSTRACT

An optical demultiplexing/multiplexing device made with a few stable components by easy fabrication processes, which provides a flat response over the specified frequency range.

The optical demultiplexing/multiplexing device built in accordance with the present invention consists of feed-through optical fiber whose optical fiber element at the edge thereof is used to feed the input light signal to the other optical fibers; a set of three multiplexing optical fibers which lead to a set of three first optical fiber elements, each multiplexed into a pair of second optical fiber elements whose edges are cut, sliced and spliced along the axes thereof in predetermined length S to form each of first optical fiber elements with the same diameter as said feedthrough optical fiber elements; paired first and second connector plugs, each having at least three alignment holes which can mate with the corresponding alignment holes in the mating connector plug; and connecting means to keep said first and second connector plugs connected.

6 Claims, 8 Drawing Sheets

FIG. 1(a)    FIG. 1(b)
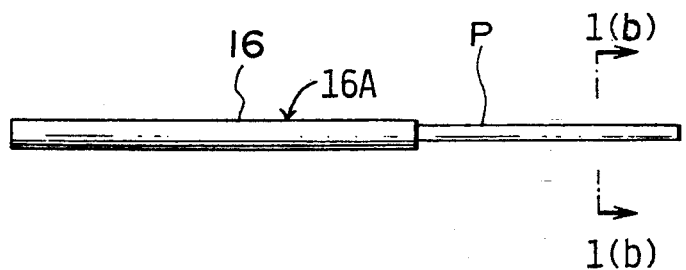 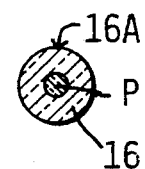
FIG. 2(a)    FIG. 2(b)
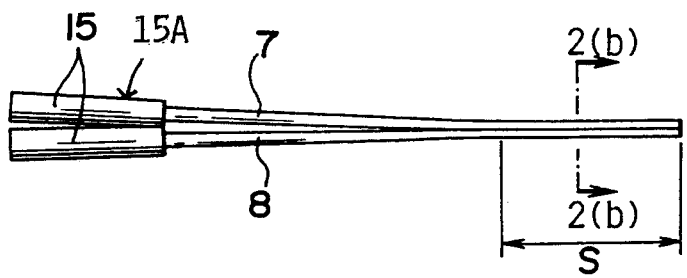 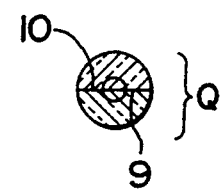
FIG. 3(a)    FIG. 3(b)    FIG. 3(c)
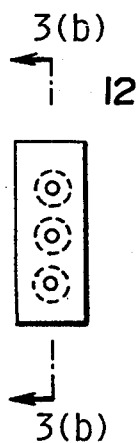 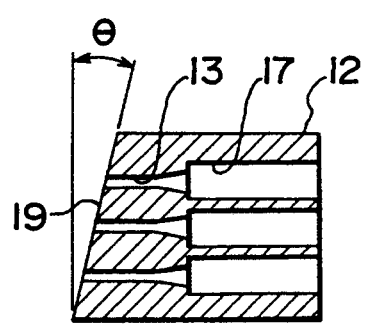 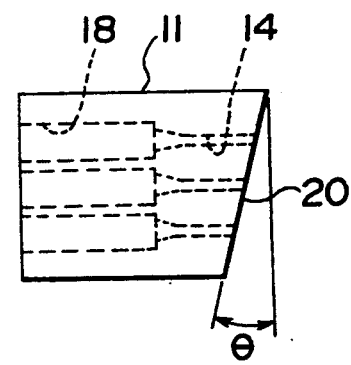

FIG. 4(a)
FIG. 4(b)
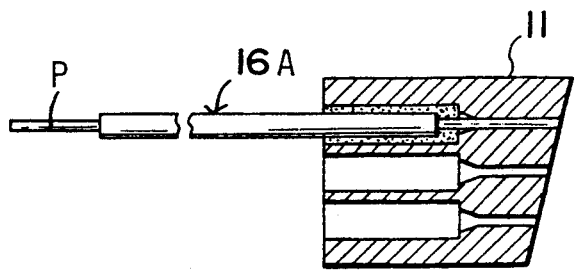
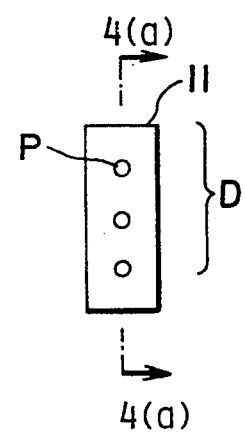
FIG. 5(a)
FIG. 5(b)
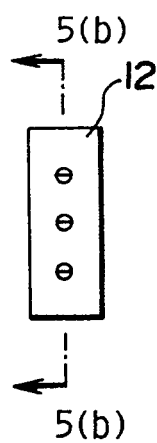
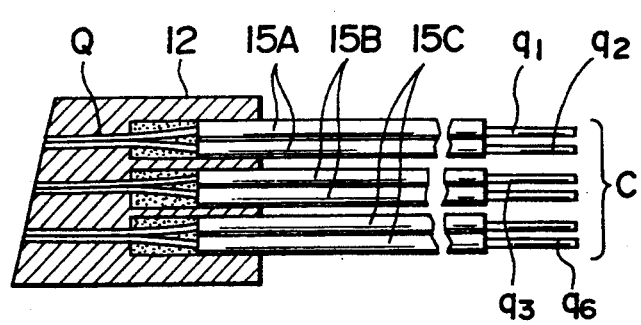

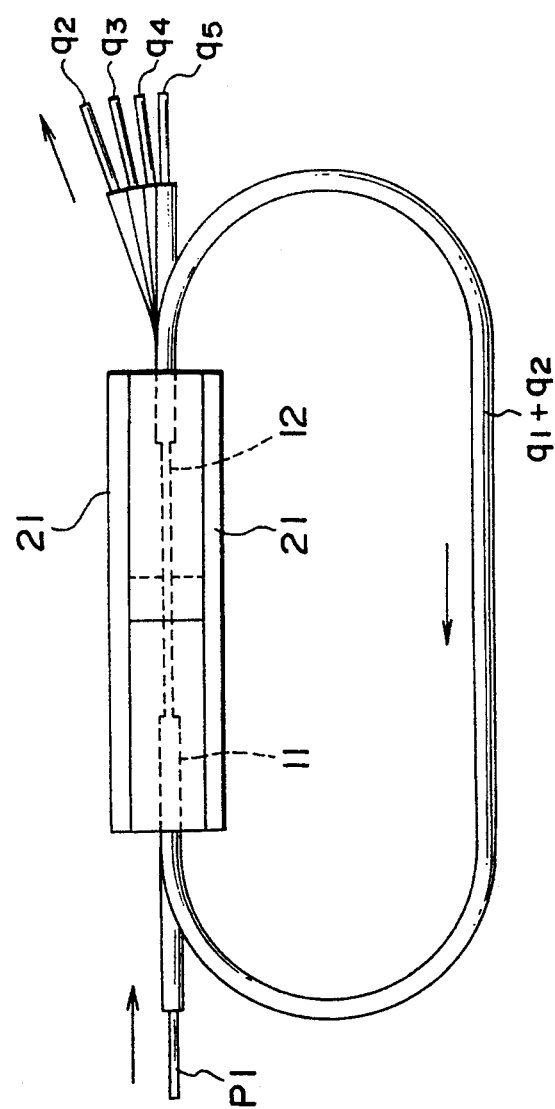

FIG. 12(a)　　FIG. 12(b)　　FIG. 12(c)
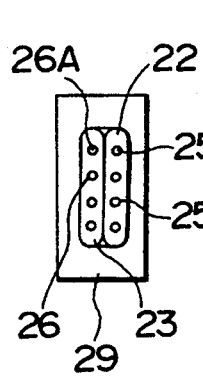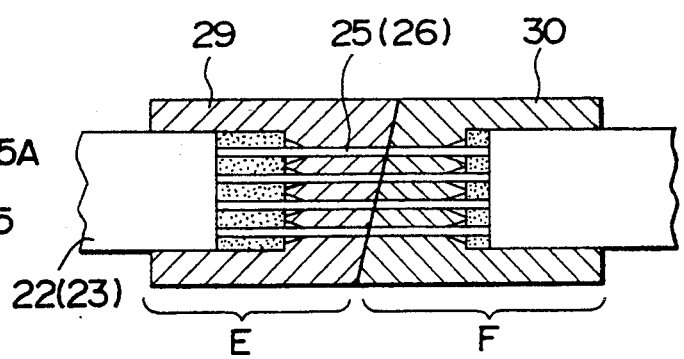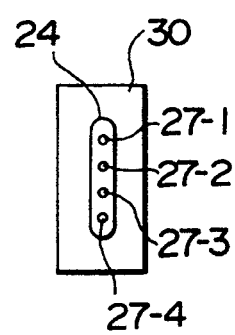
FIG. 13(a)　　FIG. 13(b)　　FIG. 13(c)
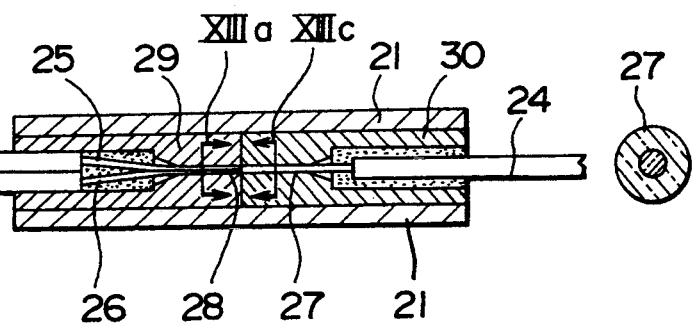

OPTICAL DEMULTIPLEXING/MULTIPLEXING DEVICE

BACKGROUND OF THE INVENTION

The present invention relates to an optical demultiplexing/multiplexing device which is used in an optical fiber communication circuit to demultiplex a light signal into a plurality of circuits or to multiplex a plurality of light signals into a single circuit, and especially to an optical demultiplexing/multiplexing device having flat spectral response for light signals consisting of a plurality of light wavelengths. It also relates to the simplification of the structure of the optical multiplexing device to demultiplex light signals from each of one or more optical fibers into a plurality of circuits, or to multiplex light signals from a plurality of optical fibers into one circuit.

FIG. 14 shows an example of a 2×2 optical demultiplexing/multiplexing device. In FIG. 14, "A" indicates the main body of the 2×2 optical demultiplexing/multiplexing device. In the optical demultiplexing/multiplexing device, the multiplexing section is composed of a pair of optical fiber elements 1 and 2. The optical multiplexing device is constructed by partly fusing the pair of optical fibers in accordance with the "fusing and drawing optical fibers" method, or by fusing the surfaces of the pair of optical fibers after they are polished in accordance with the "polishing the surfaces of optical fibers" method. The light signal passing through one optical fiber partly goes to the other optical fiber, and this type of optical coupling is accomplished by the Evanescent effect.

Light signal Ia passing through optical fiber element 1 branches into light signals $Ib_1$ and $Ib_2$ at junction 3. Since optical fiber 2 is unconnected at edge 2a, optical fiber 2 is cut at edge 2a and terminated there in such a manner that no light signal can reflect therefrom. The optical power ratio of light signal $Ib_2$ branching into optical fiber 2 to light signal $Ib_1$ passing through optical fiber 1 changes depending on the optical wavelength of the light signal if light signal Ia goes through junction 3 rightwards on an optical demultiplexing/multiplexing device actualized in accordance with the Evanescent effect. That is, the coupling coefficient of one optical fiber to the other changes in accordance with the optical signal wavelength. An optical demultiplexing/multiplexing circuit used to demultiplex an input light signal into more than two output light signals consists of two or more demultiplexing/multiplexing devices of this type, and variations of the optical power ratios from the defined value are added every time the demultiplexing/multiplexing device of this type is added to demultiplex an input light signal into two output light signals. This type of variations result in inferior uniformity in the optical output powers at the demultiplexing/multiplexing circuit outputs.

FIG. 15 shows another example of the 2×2 optical demultiplexing/multiplexing device, which can improve the uniformity in optical output powers at the demultiplexing/multiplexing circuit outputs. In FIG. 15, optical fiber elements 4 and 5 are sharply cut, sliced, and spliced at the lefthand edges thereof. The edges are thus combined to yield another optical fiber element, and the optical fiber is connected to optical fiber 6 at their lefthand edges.

This type of optical demultiplexing/multiplexing device wherein one optical fiber is connected to a pair of optical fiber elements whose connecting edges are sharply cut, sliced, and spliced at the lefthand edges thereof is disclosed in U.S. Pat. Nos. 4,666,541 and 4,720,161.

Alignment of the optical axes of the optical fiber elements, preparing the optical fiber elements, and working with these fiber elements cause problems if the teachings of these patents are used to construct an optical demultiplexing/multiplexing device.

FIG. 16 shows the configuration of a 1×8 optical demultiplexing/multiplexing device. The 1×8 optical demultiplexing/multiplexing device consists of seven 2×2 optical demultiplexing/multiplexing devices A1 through A7 and these 2×2 optical demultiplexing/multiplexing devices are connected together at junctions f1 and through f6.

The "fusion-and-splicing" method, wherein the optical fiber elements to be connected are spliced at the edges thereof to form a junction and fused there by a discharge arc, is mainly used for connecting one optical demultiplexing/multiplexing device to another.

An interconnection loss of 0.1 to 0.5 dB per junction occurs in optical fiber connections, and the interconnection losses are added for the optical demultiplexing/multiplexing device with multiple junctions. The demultiplexing/multiplexing device requires a plurality of connection parts, and the optical demultiplexing/multiplexing device with multiple junctions occupies a greater volume for the greater number of junctions.

In addition, the procedure for interconnecting a plurality of junctions in the respective 2×2 demultiplexing/multiplexing devices requires two or three minutes to fabricate a complete multiple junction device if the fusion-and-splicing method is employed to connect between optical fiber elements.

The inventor of the present invention has disclosed in U.S. Pat. No. 5,074,634 and No. 5,000,530 how to reduce the time needed for the troublesome procedure of fusing the interconnections of the respective 2×2 multiple junction devices.

Since an optical demultiplexing/multiplexing device with multiple junctions built in accordance with U.S. Pat. No. 5,074,634 and No. 5,000,530 is made of a plurality of 2×2 demultiplexing/multiplexing devices, the multiple junction device is expensive because each of the respective 2×2 demultiplexing devices are expensive. In addition, fabrication of an optical demultiplexing/multiplexing device with multiple junctions requires a greater number of processes including difficult steps. A device with multiple junctions furthermore occupies a greater volume.

The demultiplexing/multiplexing device with multiple junctions in the prior art containing many parts is expensive, and its response varies depending on the wavelength.

An objective of the present invention is to provide a demultiplexing/multiplexing device with multiple junctions, which can easily be built, contains a smaller number of parts and has a response which is flat over the specified wavelength range.

Another objective of the present invention is to provide an optical demultiplexing/multiplexing device of the star or tree type, which is made with only one optical connector, and which is characterized by ease of construction a smaller number of parts, and exhibits a flat response over the specified wavelength range. A further objective of the present invention is to provide an optical demultiplexing/multiplexing device which is suitable for demultiplexing and multiplexing of optical fibers of the ribbon type.

SUMMARY OF THE INVENTION

A 1×4 optical demultiplexing/multiplexing device built in accordance with first through third embodiments of the present invention consists of a feedthrough optical fiber member whose optical fiber element at the edge thereof is used to feed the input light signal to the other optical fibers elements; a set of three multiplexing optical fibers which lead to a set of first optical fiber elements, each multiplexed into a pair of second optical fibers whose edges are cut, sliced, and spliced along the axis thereof in predetermined length S to form each of first optical fiber elements with the same diameter as the feedthrough optical fiber element; paired first and second connector plugs, each having at least three alignment holes which can mate with the corresponding alignment holes in the mating connector plug; and connecting means to keep the first and second connector plugs connected.

In the first embodiment of the present invention, the feedthrough optical fiber element is put into a first alignment hole of the first connector plug, a first multiplexing optical fiber transition member is put into a first alignment hole of the second connector plug, the pair of optical fiber elements of the optical fiber transition member are respectively at the edges thereof put into second and third alignment holes of the first connector plug, the remaining two of the three multiplexing optical fiber members (defined as output members) are respectively put into second and third alignment holes of the second connector plug, and the first and second connector plugs are jointed by the connecting means.

In the second embodiment of the present invention, the feedthrough optical fiber element is put into a first alignment hole of the first connector plug, the first multiplexing optical fiber transition member is put into a first alignment hole of the second connector plug, the pair of optical fiber elements of the optical fiber transition member are respectively at the edges thereof put into second and third alignment holes of the second connector plug, the remaining two of the three multiplexing optical fiber members (output members) are respectively put into second and third alignment holes of the first connector plug, and the first and second connector plugs are jointed by the connecting means.

In a third embodiment of the present invention, the feedthrough optical fiber element is put into a first alignment hole of the first connector plug, the first multiplexing optical fiber transition member is put into a first alignment hole of the second connector plug, one of the pair of optical fiber elements of the optical transition member is at the edge thereof put into a second alignment hole of the second connector plug, the other of the pair of optical fiber elements of the optical transition member is at the edge thereof put into a third alignment hole of the first connector plug, the remaining two of the multiplexing optical fiber members (output members) are respectively put into a second alignment hole of the first connector plug and a third alignment hole of the second connector plug, and the first and second connector plugs are jointed by the connecting means.

The $1 \times 2^n$ ($n \geq 3$: integer) optical demultiplexing/multiplexing device in accordance with a fourth embodiment of the present invention consists of a feedthrough optical fiber member whose optical fiber element at the edge thereof is used to feed the input light signal to the other optical fiber elements; a plurality of multiplexing optical fiber members which lead to a plurality of first multiplexing optical fiber elements, each multiplexed into a pair of second optical fiber elements whose edges are cut, sliced, and spliced along the axes thereof over a predetermined length S to form each of first optical fiber elements having a circular cross-section; paired first and second connector plugs, each having a plurality of alignment holes precisely arranged in line to mate with the corresponding alignment holes in the mating connector plug; and connecting means to keep the first and second connector plugs connected.

In the fourth embodiment of the present invention, one of the pair of connector plugs is used as a multiplexing connector plug where the plurality of multiplexing optical fiber members are respectively put into the corresponding alignment holes thereof, the other of the pair of connector plugs is used as a feedthrough connector plug where the feedthrough optical fiber member is put into a first alignment hole in a first row thereof, a pair of multiplexed optical fiber members leading from a first alignment hole of the multiplexing connector plug are respectively put into second and third alignment holes in second and third rows of the feedthrough connector plug, a pair of multiplexed optical fiber members leading from a second alignment hole in a second row of the multiplexing connector plug are respectively put into fourth and fifth alignment holes in fourth and fifth rows of the feedthrough connector plug, a pair of multiplexed optical fiber members leading from a third alignment hole in a third row of the multiplexing connector plug are respectively put into sixth and seventh alignment holes in sixth and seventh rows of the feedthrough connector plug, the same processes being repeated to multiplex the light signals into $2^n$ ($n \geq 3$: integer) circuits, and the feedthrough and multiplexing connector plugs are jointed by connecting means.

The multiple 1×2 optical demultiplexing/multiplexing device built in accordance with a fifth embodiment of the present invention consists of a plurality ($m \geq 2$: integer) of feedthrough optical fiber members of the ribbon type whose optical fiber elements at the edges thereof are used to feed the input light signals to the other optical fibers; a plurality ($m \geq 2$: integer) of multiplexing optical fiber members leading to a plurality of first multiplexing optical fiber members, each multiplexed into a pair of optical fiber elements whose edges are cut, sliced, and spliced along the axes thereof in predetermined length S to form each of first optical fiber elements with the same diameter as the feedthrough optical fiber element; a pair of connector plugs, each having a plurality (at least $m \geq 2$: integer) of alignment holes which mate with the corresponding alignment holes in the mating connector plug; and connecting means to keep the pair of connector plugs connected.

In the fifth embodiment of the present invention, the plurality of feedthrough optical fibers of the ribbon type are put into one of the pair of connector plug, the plurality of multiplexing optical fibers of the ribbon type are at the edges thereof put into the other of the pair of connector plugs, and the pair of connector plugs are jointed by connecting means.

BRIEF DESCRIPTION OF THE DRAWINGS

FIG. 1(a) shows an extended top view and FIG. 1(b) shows an enlarged side view of the feedthrough optical fiber element used in a first embodiment of the optical demultiplexing/multiplexing device built in accordance with the present invention.

FIG. 2(a) shows an extended top view and FIG. 2(b) shows a side view of the multiplexing optical fiber element used in the first embodiment of the optical demultiplexing/multiplexing device built in accordance with the present invention.

FIG. 3(a) shows a side view of a second connector plug used to construct the first embodiment of the optical multiplexing device, FIG. 3(b) shows a top view of the second connector plug taken along the line 3(b)—3(b) of FIG. 3(a). FIG. 3(c) shows a top view of a first connector plug.

FIG. 4(a) shows a top view of the first connector plug taken along the line 4(a)—4(a) of FIG. 4(b) whereto a plurality of feedthrough optical fiber elements can be applied. FIG. 4(b) shows a side view thereof.

FIG. 5(a) shows a side view of the second connector plug whereto a plurality of multiplexing optical fiber elements can be applied. FIG. 5(b) shows a top view thereof.

FIG. 8 shows a front view of the first and second connector plugs of FIG. 7, which are set together by using a pair of looped optical fiber elements.

FIG. 12(a) shows a side view of a first connector plug of the "2m" type connection in a third embodiment of the optical demultiplexing/multiplexing device. FIG. 12(b) shows a top view thereof and FIG. 12(c) a side view thereof.

FIG. 13(a) shows an enlarged section of an optical fiber used in the first connector plug of the third embodiment of the optical demultiplexing/multiplexing device. FIG. 13(b) shows a front section thereof. FIG. 13(c) shows an enlarged section thereof.

DESCRIPTION OF THE PREFERRED EMBODIMENTS

Figure 6:
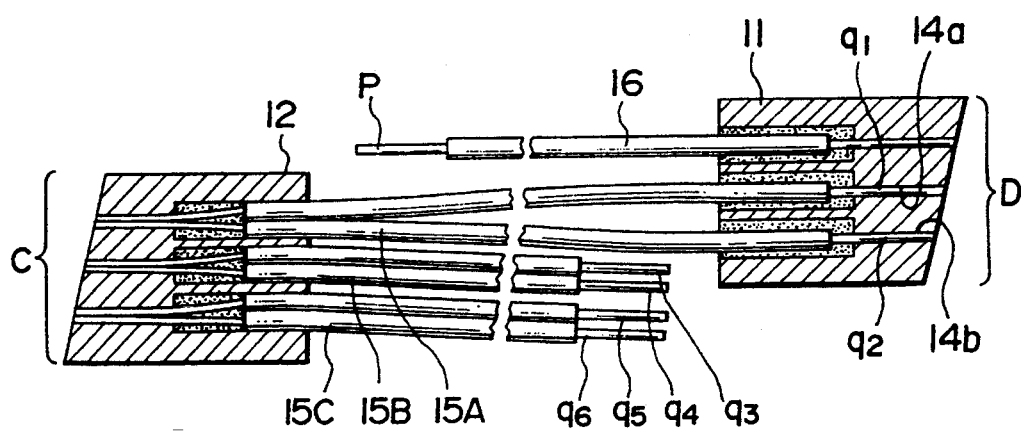
FIG. 6 shows a cross-sectional top view of first and second connector plugs where the edges of a first multiplexing optical fiber element in the second connector plug are applied to second and third rows of the first connector plug.

The optical demultiplexing/multiplexing device built in accordance with the present invention will be described referring to the drawings.

A first embodiment of the 1×4 optical demultiplexing/multiplexing device built in accordance with the present invention will be described hereinafter with reference to FIGS. 1(a) through 8.

FIG. 1(a) shows an extended top view and FIG. 1(b) shows an enlarged side view of a feedthrough optical fiber element used in the first embodiment of the optical demultiplexing/multiplexing device built in accordance with the present invention.

As shown in FIG. 1(a), a cover 16 of a feedthrough optical fiber member 16A having an optical fiber element P is partly removed at one edge.

FIG. 2(a) shows an extended top view and FIG. 2(b) shows a side view of a multiplexing optical fiber member 15A used in the first embodiment of the optical demultiplexing/multiplexing device built in accordance with the present invention. In the multiplexing optical fiber member 15A wherein optical fiber elements 7 and 8 are exposed by removing covers 15 therefrom, the respective optical fibers 7 and 8 are sliced at the edges thereof so that the ratio of the length of one optical fiber edge to the length of the other optical fiber edge becomes typically unity or an arbitrary value. The edges of the respective optical fibers 7 and 8 are finished by polishing flat surfaces 9 and 10, each having a hemicircular cross-section, along the axes of the optical fibers over a predetermined length S.

Sliced surfaces 9 and 10 are placed so that surface 9 faces surface 10, and they are finished to build an optical fiber coupling end portion Q whose cross-section is a circle with the same diameter as a normal optical fiber element of the predetermined length S. Thus, the multiplexing optical fiber member 15A has a coupling end portion Q at one end and a pair of optical fibers elements 7, 8 at the other ends.

FIGS. 3(a), 3(b) and 3(c) show first and second connector plugs 11 and 12, each having a rectangular cross-section. First connector plug 11 is provided with three holes 14, each having a small diameter, and three other holes 18, each leading through a tapered section to hole 14. Hole 14 can accurately accept optical fiber element P (used for feedthrough) and optical fiber coupling end portion Q (used for multiplexing). Hole 18 can accept the cover 16 of optical fiber element P or the covers 15 of multiplexing optical fiber element 15A. Second connector plug 12 is provided with three holes 13, each having a small diameter, and three other holes 17, each leading through a tapered section to hole 13. Hole 13 can accurately accept optical fiber element P (used for feedthrough) and optical fiber coupling end portion Q (used for multiplexing). Hole 17 can accept the cover 16 of optical fiber P or the covers 15 of multiplexing optical fiber element 15A. First and second connector plugs 11 and 12 are cut at an angle $\theta$ ($\theta > 8$ degrees) with respect to the planes perpendicular to the optical axes on the mating surfaces 20 and 19 thereof, respectively. Angle $\theta$ reduces the reflection of the light signals from the optical fiber element surfaces at the edges of the connector plugs 11 and 12 thereby improving the signal to loss ratio.

Holes having small diameters can be replaced by V-shaped grooves or by any other structures which have been used for the alignment of optical fiber elements in the prior art.

The processes of fabricating a 1×4 optical demultiplexing/multiplexing device which has been described as the first embodiment of the optical demultiplexing-/multiplexing device will be described hereinafter.

Figure 16:
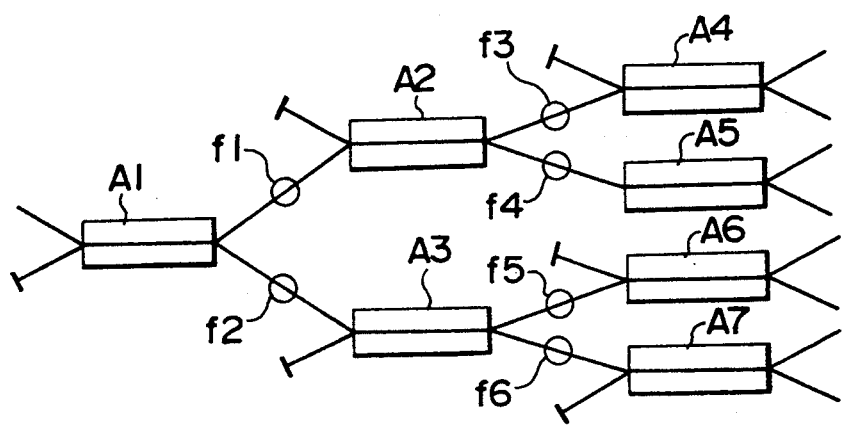
FIG. 16 shows the configuration of a 1×8 optical demultiplexing/multiplexing device of the prior art.

FIGS. 4(a) through 8 show a series of steps for fabricating the optical multiplexing device. FIGS. 4(a) and 4(b) show first connector plug 11 to which optical fiber element P of an optical FIG. 16A (on feedthrough connector plug D) is applied.

Figure 7:
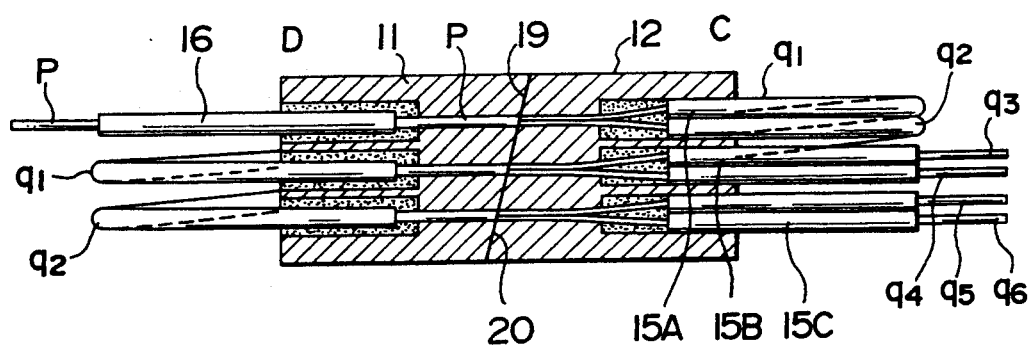
FIG. 7 shows a cross-sectional top view of the first and second connector plugs of FIG. 6 which are set together.

FIGS. 5(a) and 5(b) show the second connector plug 12 (multiplexing connector plug C) to which the coupling end portions Q of optical fiber members 15A, 15B, and 15C are applied. Multiplexed optical fiber elements q1 and q2 of optical fiber member 15A, arranged in a first row on second connector plug 12 (multiplexing connector plug C) are, as shown in FIG. 6, put into second and third holes 14a and 14b, each having a small diameter, on first connector plug 11 (feedthrough connector plug D). Optical fiber member 15A is thus installed in the connector plugs 11 and 12. FIGS. 7 and 8 show the cross-sectional side and top views of a pair of first and second connector plugs 11 and 12. In FIG. 8, first and second connector plugs 11 and 12 are put together by using connecting means 21. Connecting means 21 in the embodiment of FIG. 8 are made of a plate of super hard alloy characterized by a low linear expansion coefficient, and they are fastened to the connector plugs on the lower and upper sides thereof by using an adhesive agent. A glass plate characterized by low linear expansion coefficient can also be used as a set panel.

The light signal multiplexing performed by the 1×4 optical demultiplexing/multiplexing device of the present embodiment will be described hereinafter.

Figure 9A:
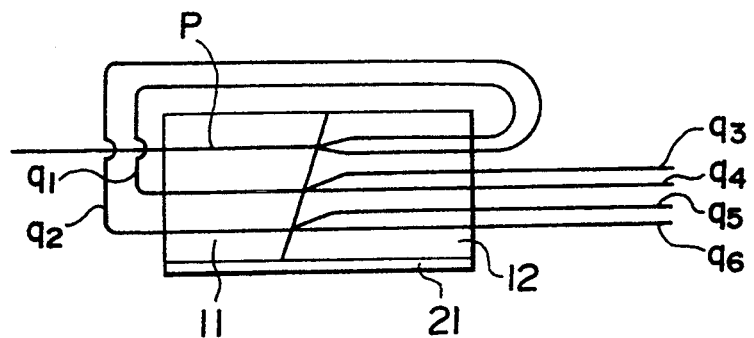
FIGS. 9(a), 9(b) and 9(c) show the different types of connections of first connector plug to the second connector plug respectively in the first embodiment of the present invention.

The light signal coming from optical fiber element P in the first row on first connector plug 11 (feedthrough connector plug D) is fed to optical fiber elements q1 and q2 in the first row on second connector plug 12 (multiplexing connector plug C). Since optical fiber elements q1 and q2 connect plugs 11 and 12, the multiplexing optical fibers 15A of which they are a part is defined as a multiplexing optical fiber transition member. The multiplexing is performed as shown in FIG. 7 in accordance with the above process. Optical fiber elements q1 and q2 at the edges thereof lead to second and third rows on first connector plug 11 (feedthrough connector plug D). The light signals coming from optical fiber elements q1 and q2 are, as shown in FIG. 9(a), respectively fed to optical fiber elements q3 through q6 in second and third rows on second connector plug 12 (multiplexing connector plug C). Since optical fiber elements q3 to q6 provide output signals, the multiplexing optical fibers 15B and 15C of which they are a part are defined as multiplexing optical fiber output members. Seven holes, each having a small diameter, can be provided on each connector plug of if four more optical fiber elements are added to each connector plug of FIG. 7. In this configuration, one light signal can be multiplexed to eight circuits in accordance with the same repetitive processes. One light signal can be multiplexed to $2^n$ circuits (n: integer) in accordance with the same processes repeated "n" times and a $1 \times 2^n$ optical demultiplexing/multiplexing device can be built in this manner.

Figure 9B:
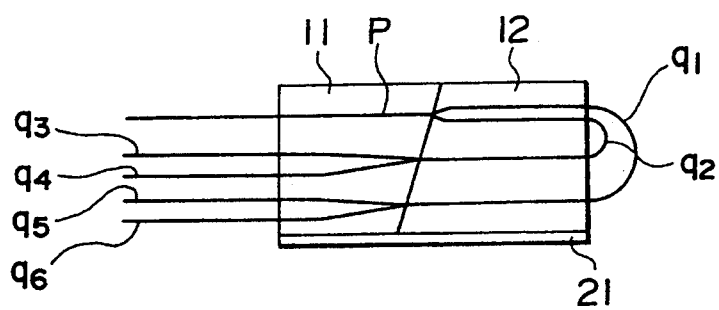
Figure 9C:
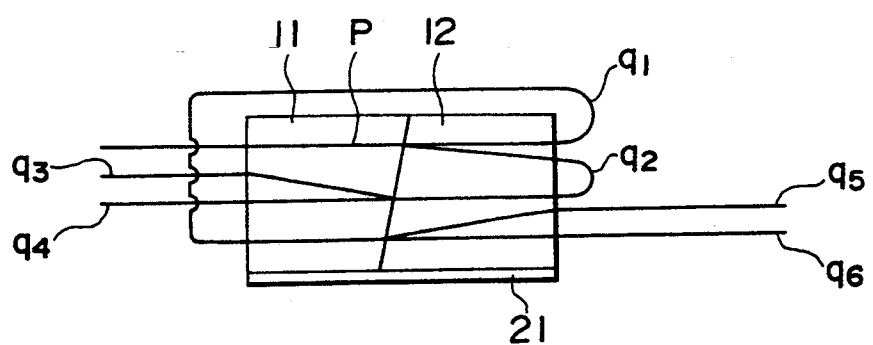

FIG. 9(b) and 9(c) are construction schemes other than FIG. 9(a) whereby a 1×4 optical demultiplexing-/multiplexing device can be built. One of these construction schemes can selectively be used for multiplexing if a special structure is needed.

Figure 10:
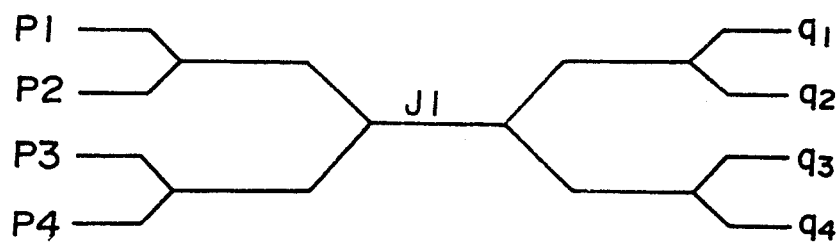
FIG. 10 shows the connections of a first connector plug to second connector plug in a second embodiment of the optical demultiplexing/multiplexing device of the star type built in accordance with the present invention.
Figure 11:
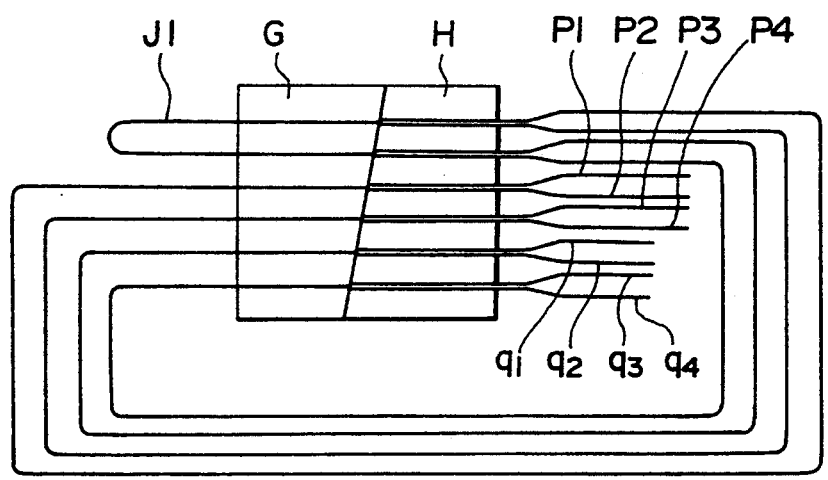
FIG. 11 shows a top view of first and second connector plugs in the second embodiment of the optical demultiplexing/multiplexing device.
Figure 14:
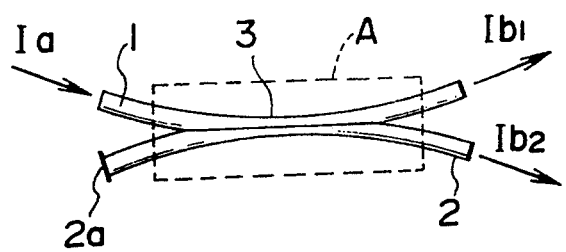
FIG. 14 shows an example of a 1×2 optical demultiplexing/multiplexing device of the prior art.
Figure 15:
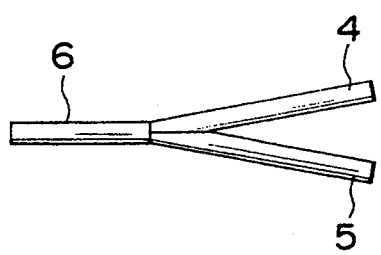
FIG. 15 shows another example of a 1×2 optical demultiplexing/multiplexing device of the prior art.

FIGS. 10 and 11 show the schematic diagram and construction of a 4×4 optical demultiplexing/multiplexing device of the star type, respectively. The 4×4 optical demultiplexing/multiplexing device of the star type, shown in, FIGS. 10 and 11, is a second embodiment of the optical demultiplexing/multiplexing device built in accordance with the present invention.

This type of optical demultiplexing device is an advanced version of the basic construction of the optical demultiplexing/multiplexing device described heretofore.

FIG. 10 shows the connections of the optical fiber elements in the 4×4 optical demultiplexing/multiplexing device, wherein optical fiber elements P1 through P4 in the first four circuits on the lefthand side of the drawing are connected to optical fiber elements q1 through q4 in the second four circuits on the righthand side of the drawing.

FIG. 11 shows a top view of the 4×4 optical demultiplexing/multiplexing device of FIG. 10, wherein H and G indicate the multiplexing connector plug and feedthrough connector plug, respectively. Each connector plug provides six alignment holes arranged in a line.

Optical fiber element J1 whose one edge is connected to the alignment hole in the first row on feedthrough connector plug G is connected to a hole in the second row on connector plug G.

A pair of optical fiber elements in the first row on multiplexing connector plug H are connected to third and fourth rows on feedthrough connector plug G, and holes in the third and fourth rows on multiplexing connector plug H lead to the two pairs of optical fiber elements P1 through P4. The above scheme corresponds to the first four circuits on the lefthand side of the optical demultiplexing/multiplexing device of FIG. 10.

A pair of optical fiber elements in the second row on multiplexing connector plug H are connected to fifth and sixth rows on feedthrough connector plug G, and holes in the fifth and sixth rows of multiplexing connector plug H lead to two pairs of optical fiber elements q1 through q4. The above scheme corresponds to the second four circuits on the righthand side of the optical demultiplexing/multiplexing device of FIG. 10. In a second embodiment of FIG. 11, eight more alignment holes can be added to each connector plug and provided in line on each connector plug. An 8×8 optical demultiplexing/multiplexing device of the star type can be built in this manner.

A variety of optical demultiplexing/multiplexing devices can be built if the number of alignment holes is altered and if the connections are changed.

FIGS. 12(b) and 13(b) respectively show the top and front views of an optical demultiplexing/multiplexing device built in accordance with a third embodiment of the present invention. In FIG. 12(b), the number of alignment holes (m) is specified as four (m=4) and the number of columns as two (2m holes) for the connector plug on the lefthand side of the drawing.

Feedthrough optical fiber ribbon 24 consists of four optical fiber elements 27-1 through 27-4. A pair of optical fiber ribbons 22 and 23, each ribbon consisting of four feedthrough optical fiber elements at the edges thereof, lead to a multiplexing optical fiber ribbon.

Optical fiber elements 25A and 26A are respectively cut, sliced, and spliced at the edges thereof along the axes thereof. The edges are thus joined to yield another optical fiber element. The front view of an optical fiber element edge 28 constituting a combined portion is shown in FIG. 13(b).

First connector plug 29 provides four alignment holes to accept four optical fiber elements of a ribbon, and it can accept edges 28 of optical fiber elements in a multiplexing optical fiber ribbon. After edges 28 of the optical fiber elements are put into alignment holes of first connector plug 29, they are fastened there.

Second connector plug 30 provides four alignment holes to accept four optical fiber elements of a ribbon, and it can accept edges 28 of optical fiber elements in a feedthrough optical fiber ribbon. After edges 28 of the optical fiber elements are put into alignment holes of second connector plug 30, they are fastened there.

The first and second connector plugs 29 and 30 are coupled together by connecting means 21 to form an optical demultiplexing/multiplexing device of the "2m" type (m=4).

As described above, the optical demultiplexing/multiplexing device of this type consists of a pair of connector plugs, each having two or more alignment holes, a plurality of multiplexing optical fiber pairs, each pair having been finished so that a pair of flat surfaces at the edges thereof are put together, a plurality of feedthrough optical fibers, and connecting means which are typically an adapter using these components. In this way an optical demultiplexing/multiplexing device can be built since these components are stable against mechanical shock and vibration as well as ambient change.

The optical demultiplexing/multiplexing device of the multiple output type can be built in accordance with the following processes. That is: A feedthrough optical fiber element passing through the corresponding alignment hole of the feedthrough connector plug is led to the corresponding alignment hole of the multiplexing connector plug so as to multiply by a factor of 2 the corresponding optical fiber element. A pair of multiplexed optical fiber elements are folded and set back to the feedthrough connector plug. These optical fiber elements are respectively led to the corresponding alignment holes of the multiplexing connector plug so as to multiply by a factor of 2 the corresponding pair of optical fiber elements. This process is repeated to multiply by a factor of $2^n$ (n: an integer) the first optical fiber element. Thus, multiplexing becomes easy.

This type of optical demultiplexing/multiplexing device can provide 16 through 32 outputs without the use of a non-reflection termination although a non-reflection termination is needed for each 2×2 optical demultiplexing/multiplexing device in the prior art. This structure reduces the cost of components, simplifies the fabrication processes, and reduces the size of the device.

An optical demultiplexing/multiplexing device built in accordance with the present invention employs the connection of the optical fiber elements at the edges thereof, but not the optical coupling due to the Evanescent effect in the prior art. Variations of the optical response over the specified wavelength range have been reduced.

What is claimed is:

1. A 1×4 optical demultiplexing/multiplexing device for coupling input light impinging on a feedthrough optical fiber member to first and second multiplexing optical fiber output members said feedthrough optical fiber member having an optical fiber element with a given cross-sectional area, the first multiplexing optical fiber output member having first and second optical fiber elements each having first and second opposite ends, the first ends of said first and second optical fiber elements being joined to provide a first output coupling end portion having substantially said given cross-sectional area, and the second multiplexing optical fiber output member having third and fourth optical fiber elements each having first and second opposite ends, the first ends of said fifth and sixth optical fiber elements being joined to provide a second output coupling end portion having substantially said given cross-sectional area, said demultiplexing/multiplexing device comprising first and second connector plugs each of said connector plugs having at least first, second and third alignment holes therein;

connecting means attached to said first and second connector plugs, said connecting means positioning said first and second connector plugs so that the first, second and third alignment holes of said first connector plug are in alignment with the first, second and third alignment holes respectively of said second connector plug; and a multiplexing optical fiber transition member having first and second optical fiber elements each having first and second ends, the first ends of said first and second optical fiber elements being joined to provide a transition coupling end portion having substantially said given cross-sectional area, wherein said feedthrough optical fiber member is placed in the first alignment hole of said first connector plug, the transition coupling end portion of said multiplexing optical fiber transition member is placed in the first alignment hole of said second connector plug, the second ends of the first and second optical fiber elements of said multiplexing optical fiber transition member are placed in the second and third alignment holes respectively of said first connector plug, and the first and second output coupling end portions of said first and second multiplexing optical fiber output members are placed in the second and third alignment holes respectively of said second connector plug, light input to said feedthrough optical fiber member being output at the second ends of the optical fiber elements of said first and second multiplexing optical fiber members.

2. A 1×4 optical demultiplexing/multiplexing device for coupling input light impinging on a feedthrough optical fiber member to first and second multiplexing optical fiber output members, said feedthrough optical fiber member having an optical fiber element with a given cross-sectional area, the first multiplexing optical fiber output member having first and second optical fiber elements each having first and second opposite ends, the first ends of said first and second optical fiber elements being joined to provide a first output coupling end portion having substantially said given cross-sectional area, and the second multiplexing optical fiber output member having third and fourth optical fiber elements each having first and second opposite ends, the first ends of said third and fourth optical fiber elements being joined to provide a second output coupling end portion having substantially said given cross-sectional area, said demultiplexing/multiplexing device comprising first and second connector plugs each of said connector plugs having at least first, second and third alignment holes therein;

connecting means attached to said first and second connector plugs, said connecting means positioning said first and second connector plugs so that the first, second and third alignment holes of said first connector plug are in alignment with the first, second and third alignment holes respectively of said second connector plug; and a multiplexing optical fiber transition member having first and second optical fiber elements each having first and second ends, the first ends of said first and second optical fiber elements being joined to provide a transition coupling end portion having substantially said given cross-sectional area, wherein said feedthrough optical fiber is placed in the first alignment hole of said first connector plug, the transition coupling end portion of said multiplexing optical fiber transition member is placed in the first alignment hole of said second connector plug, the second ends of the first and second optical fiber elements of said multiplexing optical fiber transition member are placed in the second and third alignment holes respectively of said second connector plug, and the first and second output coupling end portions of said first and second multiplexing optical fiber members are placed in the second and third alignment holes respectively of said first connector plug, light input to said feedthrough optical fiber member being output at the second ends of the optical fiber elements of said first and second multiplexing optical fiber members.

3. A 1×4 optical demultiplexing/multiplexing device for coupling input light impinging on a feedthrough optical fiber member to first and second multiplexing optical fiber output members, said feedthrough optical fiber member having an optical fiber element with a given cross-sectional area, the first multiplexing optical fiber output member having first and second optical fiber elements each having first and second opposite ends, the first ends of said first and second optical fiber elements being joined to provide a first output coupling end portion having substantially said given cross-sectional area, and the second multiplexing optical fiber output member having third and fourth optical fiber elements each having first and second opposite ends, the first ends of said third and fourth optical fiber elements being joined to provide a second output coupling end portion having substantially said given cross-sectional area, said demultiplexing/multiplexing device comprising first and second connector plugs each of said connector plugs having at least first, second and third alignment holes therein;

connecting means attached to said first and second connector plugs, said connecting means positioning said first and second connector plugs so that the first, second and third alignment holes of said first connector plug are in alignment with the first, second and third alignment holes respectively of said second connector plug; and a multiplexing optical fiber transition member having first and second optical fiber elements each having first and second ends, the first ends of said first and second optical fiber elements being joined to provide a transition coupling end portion having substantially said given cross-sectional area, wherein said feedthrough optical fiber is placed in the first alignment hole of said first connector plug, the transition coupling end portion of said multiplexing optical fiber transition member is placed in the first alignment hole of said second connector plug, the second ends of the first and second optical fiber elements of said multiplexing optical fiber transition member are placed in the third alignment hole of said first connector plug and the second alignment hole of said second connector plug respectively, the first output coupling end portion of said first multiplexing optical fiber member is placed in the second alignment hole of said first connector plug and the second output coupling end portion of said second multiplexing optical fiber member is placed in the third alignment hole of said second connector plug, light input to said feedthrough optical fiber member being output at the second ends of the optical fiber elements of said first and second multiplexing optical fiber members.

4. A $1 \times 2^n$ optical demultiplexing/multiplexing device for coupling input light impinging on a feedthrough optical fiber member to $2^n/2$ multiplexing optical fiber output members, where n is an integer equal to 2 or greater, said feedthrough optical fiber member having an optical fiber element with a given cross-sectional area, and each of the multiplexing optical fiber output members having first and second optical fiber elements each having first and second opposite ends, the first ends of the optical fiber elements of each of said plurality of multiplexing optical fiber members being joined to provide an output coupling end portion having substantially said given cross-sectional area, said demultiplexing/multiplexing device comprising first and second connector plugs, each of said connector plugs having $2^n-1$ alignment holes therein;

connecting means attached to said first and second connector plugs, said connecting means positioning said first and second connector plugs so that each of the alignment holes of said first connector plug is in alignment with a corresponding alignment hole of said second connector plug; and $2^n/2-1$ multiplexing optical fiber transition members each having first and second optical fiber elements each having first and second ends, the first ends of said first and second optical fiber elements being joined to provide a transition coupling end portion having substantially said given cross-sectional area, wherein said feedthrough optical fiber is placed in the first alignment hole of said first connector plug, the transition coupling end portions of said multiplexing optical fiber transition members are placed in $2^n/2-1$ alignment holes of said second connector plug, the second ends of the optical fiber elements of said multiplexing optical fiber transition members are placed in $2^n-2$ alignment holes of said first connector plug, and the output coupling end portions of said multiplexing optical fiber output members are placed in the remaining $2^n/2$ alignment holes of said second connector plug, light input to said feedthrough optical fiber member being output at the second ends of the $2^n$ optical fiber elements of said $2^n/2$ multiplexing optical fiber output members.

5. A multiple 1×2 optical demultiplexing/multiplexing device for coupling input light impinging on a ribbon type feedthrough optical fiber member to first and second ribbon type multiplexing optical fiber members, said feedthrough optical fiber member and each of said multiplexing optical fiber members having m optical fiber elements each with a given cross-sectional area and first and second opposite ends, the first ends of corresponding optical fiber elements of the fiber optical elements in said first and second ribbon type multiplexing optical fiber members being joined to provide a plurality of coupling end portions each having substantially said given cross-sectional area, said demultiplexing/multiplexing device comprising first and second connector plugs, each of said connector plugs having m alignment holes therein; and
   connecting means attached to said first and second connector plugs, said connecting means positioning said first and second connector plugs so that the alignment holes of said first connector plug are in alignment with corresponding alignment holes of said second connector plug; wherein
   the m optical fiber elements of said ribbon type feedthrough optical fiber member are placed in the alignment holes of said first connector plug and the plurality of coupling end portions of the optical fiber elements of said first and second multiplexing optical fiber members are placed in the alignment holes of said second connector plug, light input to said plurality of fiber optical elements of said ribbon type feedthrough optical fiber member being output at the second ends of said plurality of optical fiber elements of said ribbon type multiplexing optical fiber members.

6. A 4×4 optical demultiplexing/multiplexing device for coupling four input light signals impinging on first and second input optical fiber members to four output light signals at first and second output optical fiber members, each of said input and output optical fiber members comprising first and second optical fiber elements each having first and second opposite ends, the first ends of the optical fiber elements being joined to provide a coupling end portion having a cross-sectional area which is substantially the same as the cross-sectional area of each of the second ends of each of said optical fiber elements, said optical demultiplexing/multiplexing device comprising first and second multiplexing optical fiber transition members each having first and second optical fiber elements each having first and second ends, the first ends of said first and second optical fiber elements being joined to provide a transition coupling end portion having a cross-sectional area which is substantially the same as the cross-sectional areas of the optical fiber elements of said input and output optical fiber members;
   a feedthrough optical fiber element having first and second ends;
   first and second connector plugs, each of said connector plugs having at least first, second, third, fourth, fifth and sixth alignment holes therein; and connecting means attached to said first and second connector plugs, said connecting means positioning said first and second connector plugs so that the first, second, third, fourth, fifth and sixth alignment holes of said first connector plug are in alignment with the first, second, third, fourth, fifth and sixth alignment holes of said second connector plug, wherein
   the first and second ends of said feedthrough optical fiber element are placed in the first and second alignment holes of said first connector plug, the transition coupling end portion of said-first multiplexing optical fiber transition member is placed in the first alignment hole of said second connector plug, the second ends of the first and second optical fiber elements of said first multiplexing optical fiber transition member are placed in the third and fourth holes of said first connector plug, the coupling end portions of said first and second input optical fiber members are placed in the third and fourth alignment holes of said second connector plug, the transition coupling end portion of said second multiplexing optical fiber transition member is placed in the second alignment hole of said second connector plug, the second ends of the first and second optical fiber elements of said second multiplexing optical fiber transition member are placed in the fifth and sixth holes of said first connector plug, and the coupling end portions of said first and second output optical fiber members are placed in the fifth and sixth alignment holes of said second connector plug.

* * * * *